Figure 1:
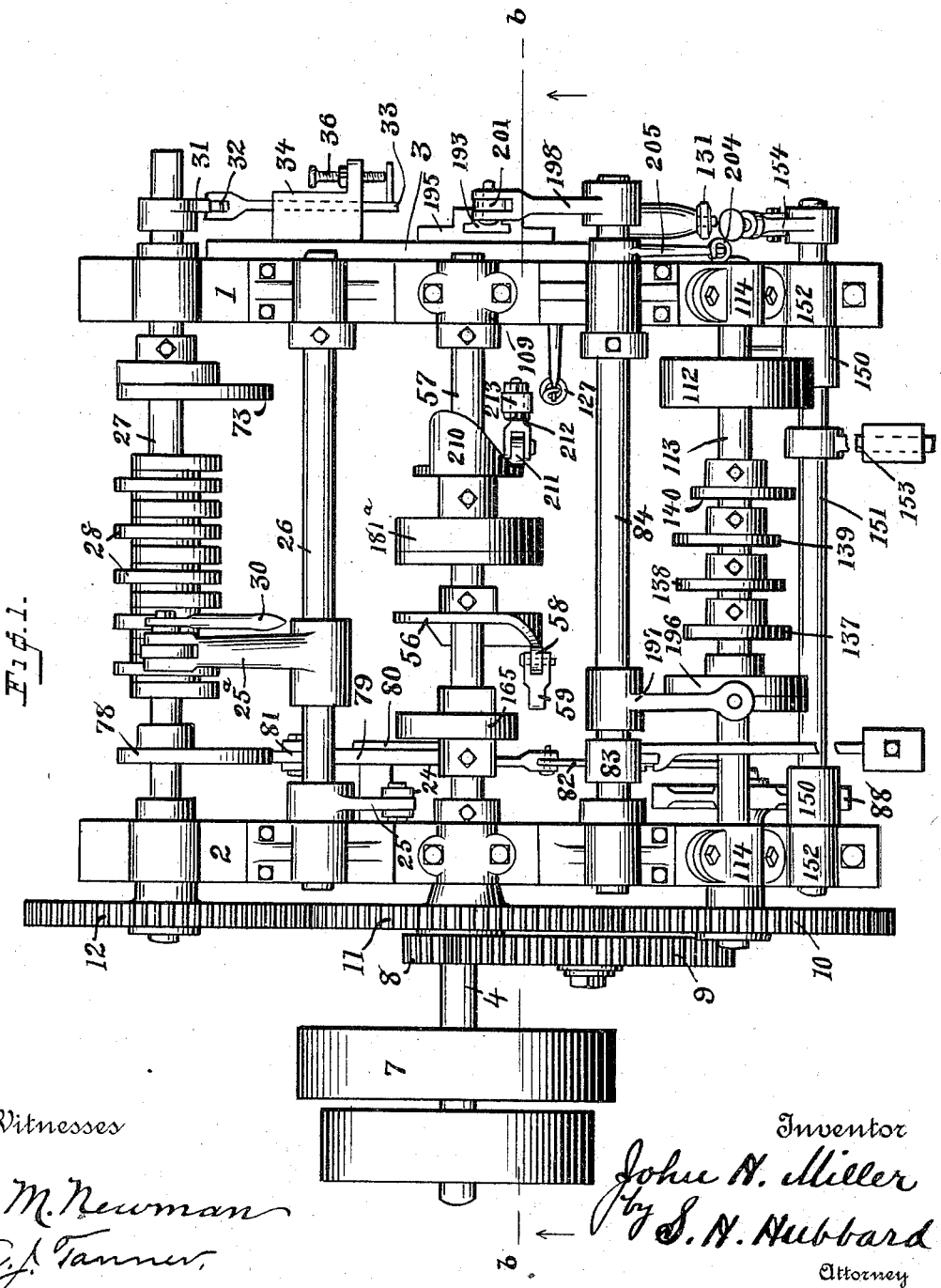

(No Model.) 12 Sheets—Sheet 1.
J. H. MILLER.
MACHINE FOR MAKING WIRE SPRINGS.

No. 537,472. Patented Apr. 16, 1895.

Witnesses
C. M. Newman
A. J. Tanner

Inventor
John H. Miller
by S. N. Hubbard
Attorney (No Model.) 12 Sheets—Sheet 2.

J. H. MILLER.
MACHINE FOR MAKING WIRE SPRINGS.

No. 537,472. Patented Apr. 16, 1895.

Witnesses
C. M. Newman
A. J. Tanner

Inventor
Jno. H. Miller
by S. H. Hubbard
Attorney (No Model.)
12 Sheets—Sheet 3.
J. H. MILLER.
MACHINE FOR MAKING WIRE SPRINGS.
No. 537,472.  Patented Apr. 16, 1895.
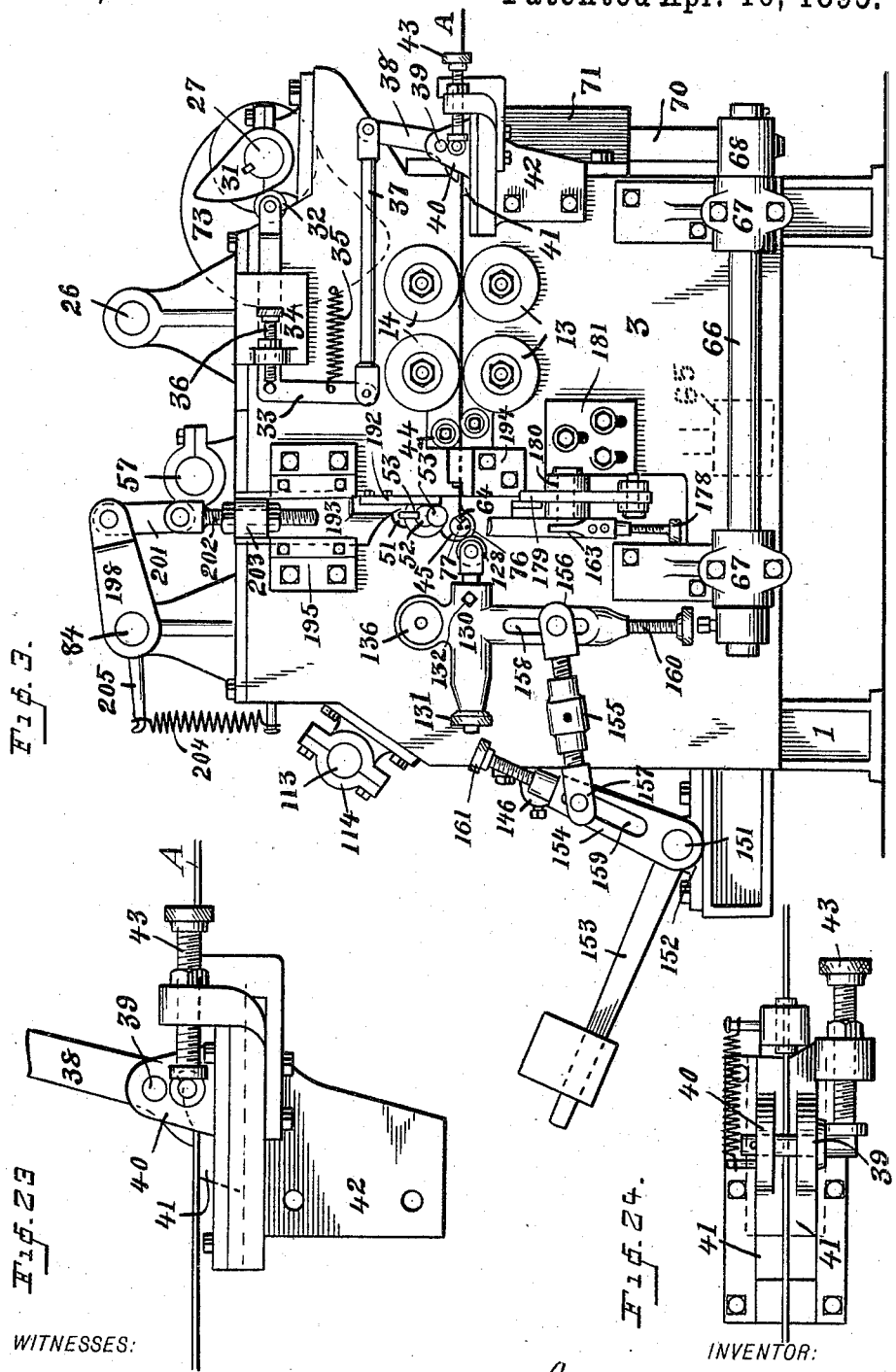
WITNESSES:
C. M. Newman
A. J. Tanner
INVENTOR:
John H. Miller
BY S. H. Hubbard
ATTORNEY (No Model.) 12 Sheets—Sheet 4.
J. H. MILLER.
MACHINE FOR MAKING WIRE SPRINGS.
No. 537,472. Patented Apr. 16, 1895.
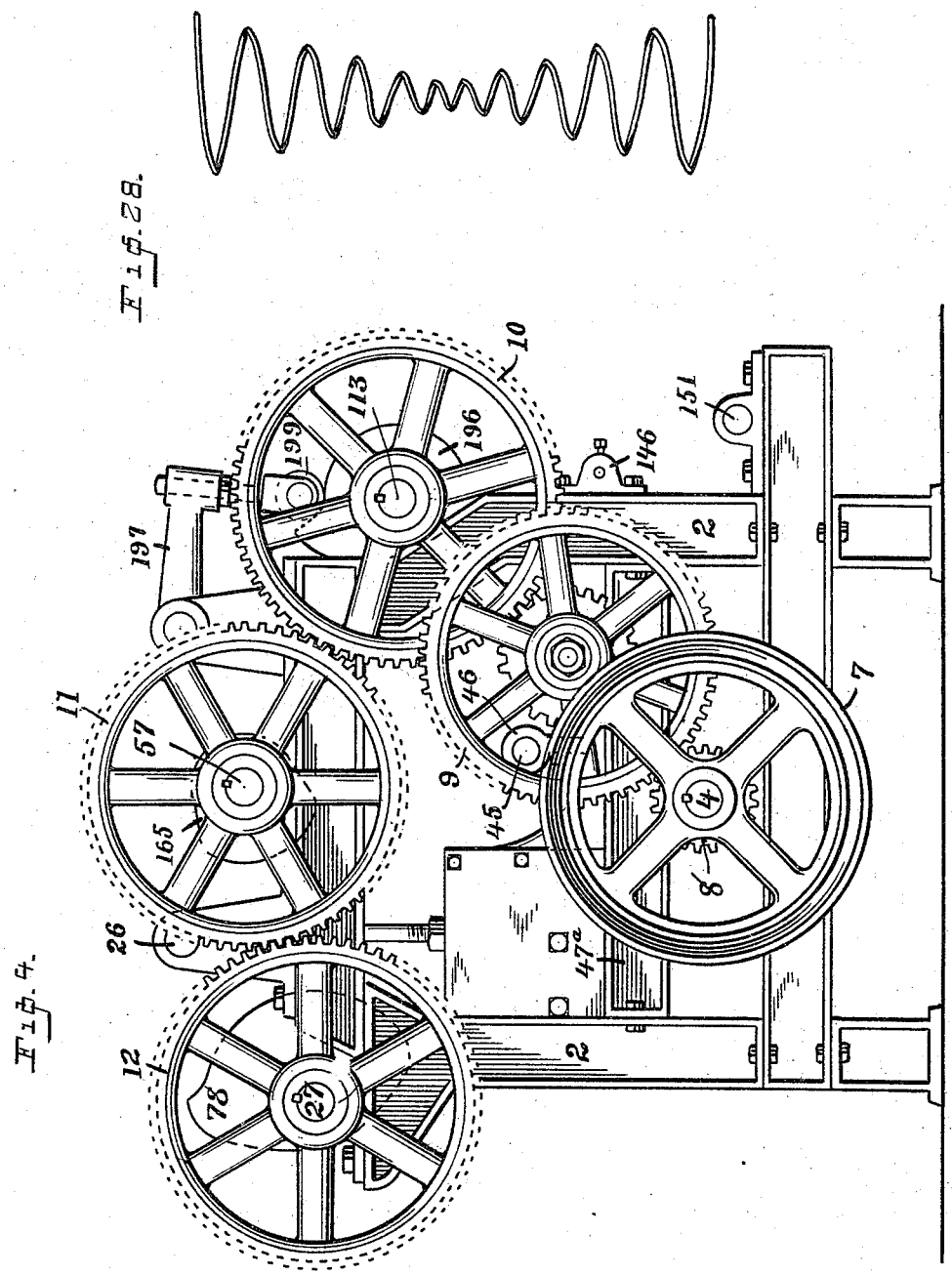
Witnesses
C. M. Newman
A. J. Tanner
Inventor
John H. Miller
by S. H. Hubbard
Attorney (No Model.) 12 Sheets—Sheet 5.
J. H. MILLER.
MACHINE FOR MAKING WIRE SPRINGS.
No. 537,472. Patented Apr. 16, 1895.
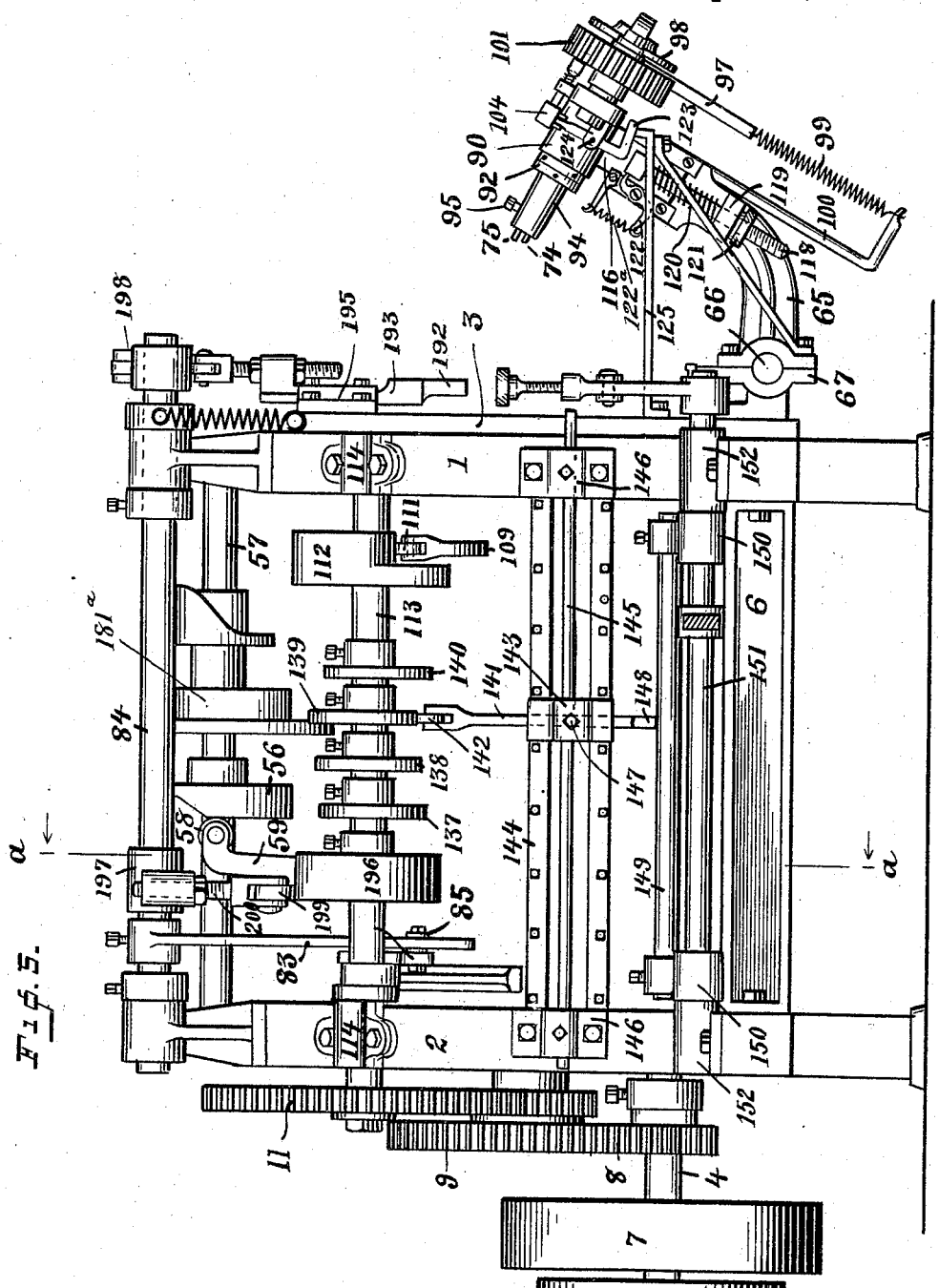
Witnesses
C. M. Newman
A. J. Tanner
Inventor
John H. Miller
by S. N. Hubbard
Attorney

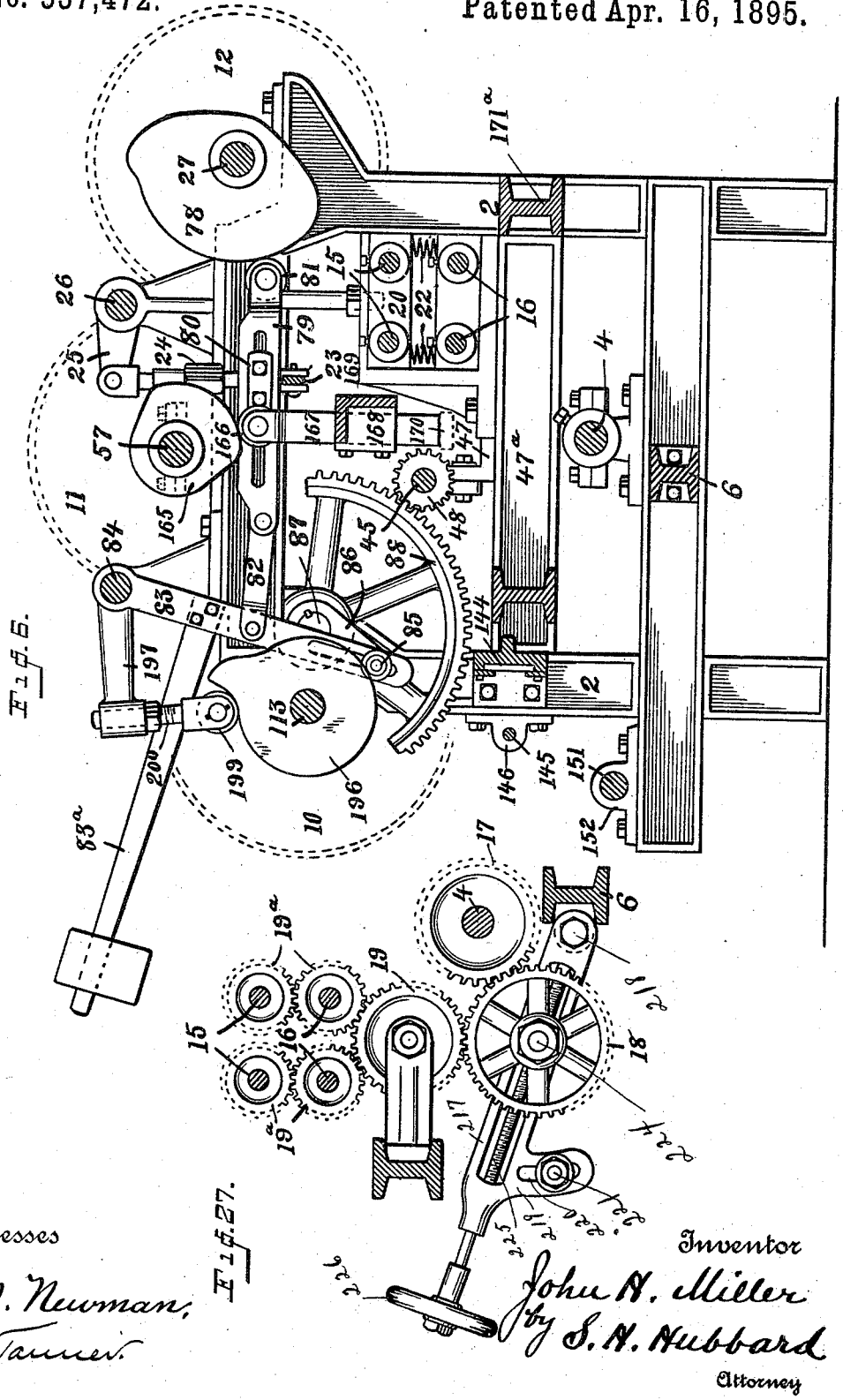

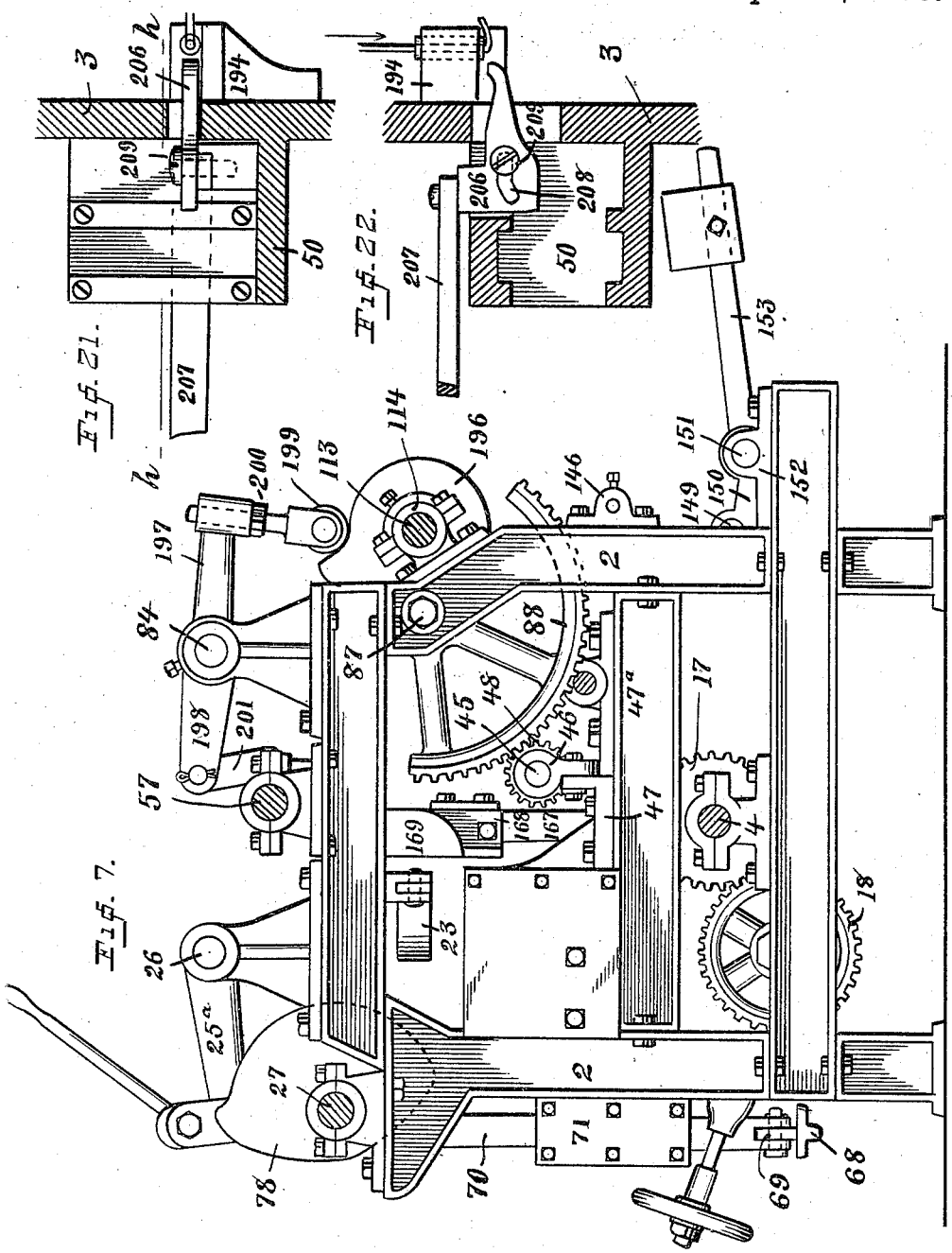

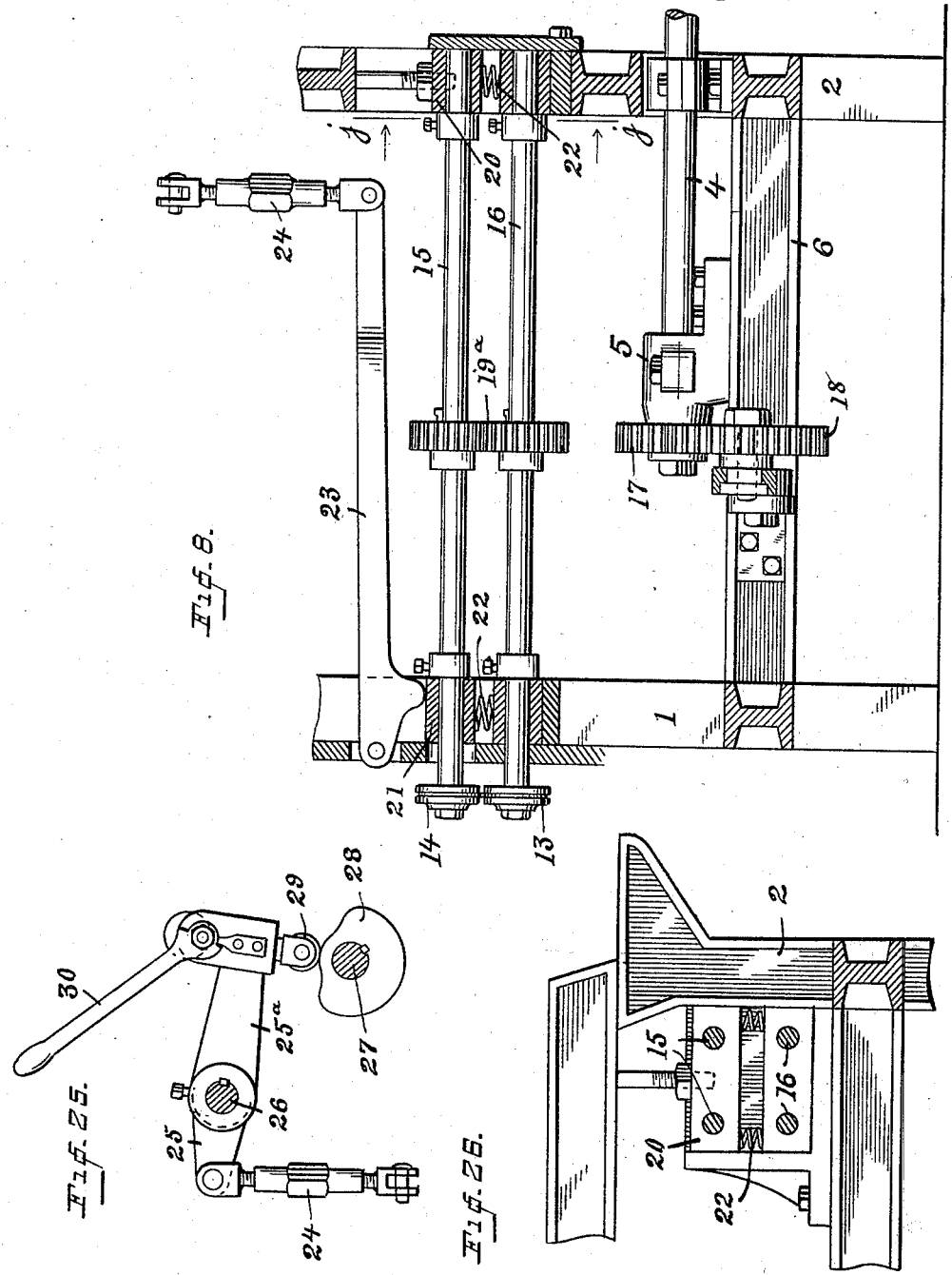

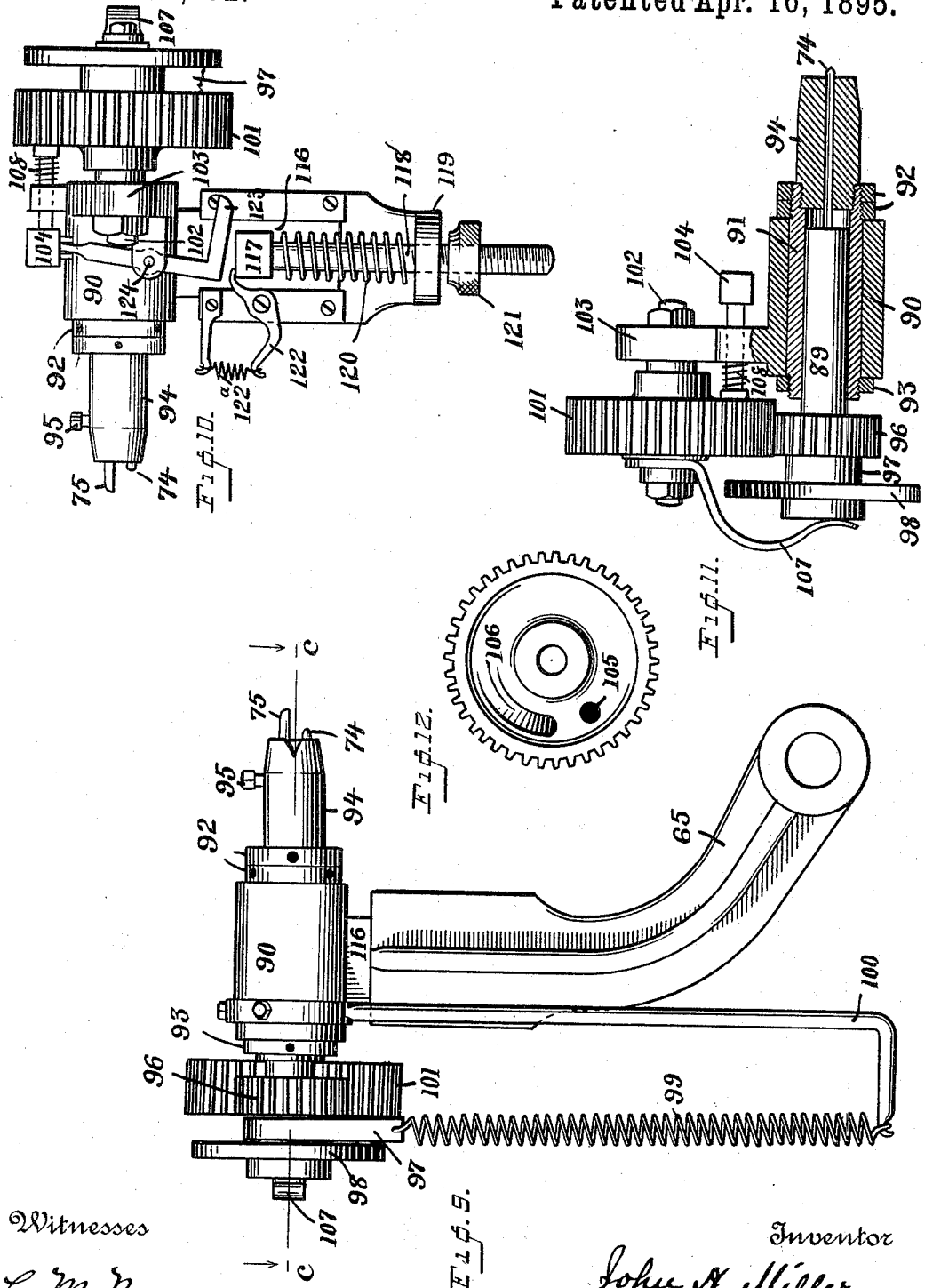

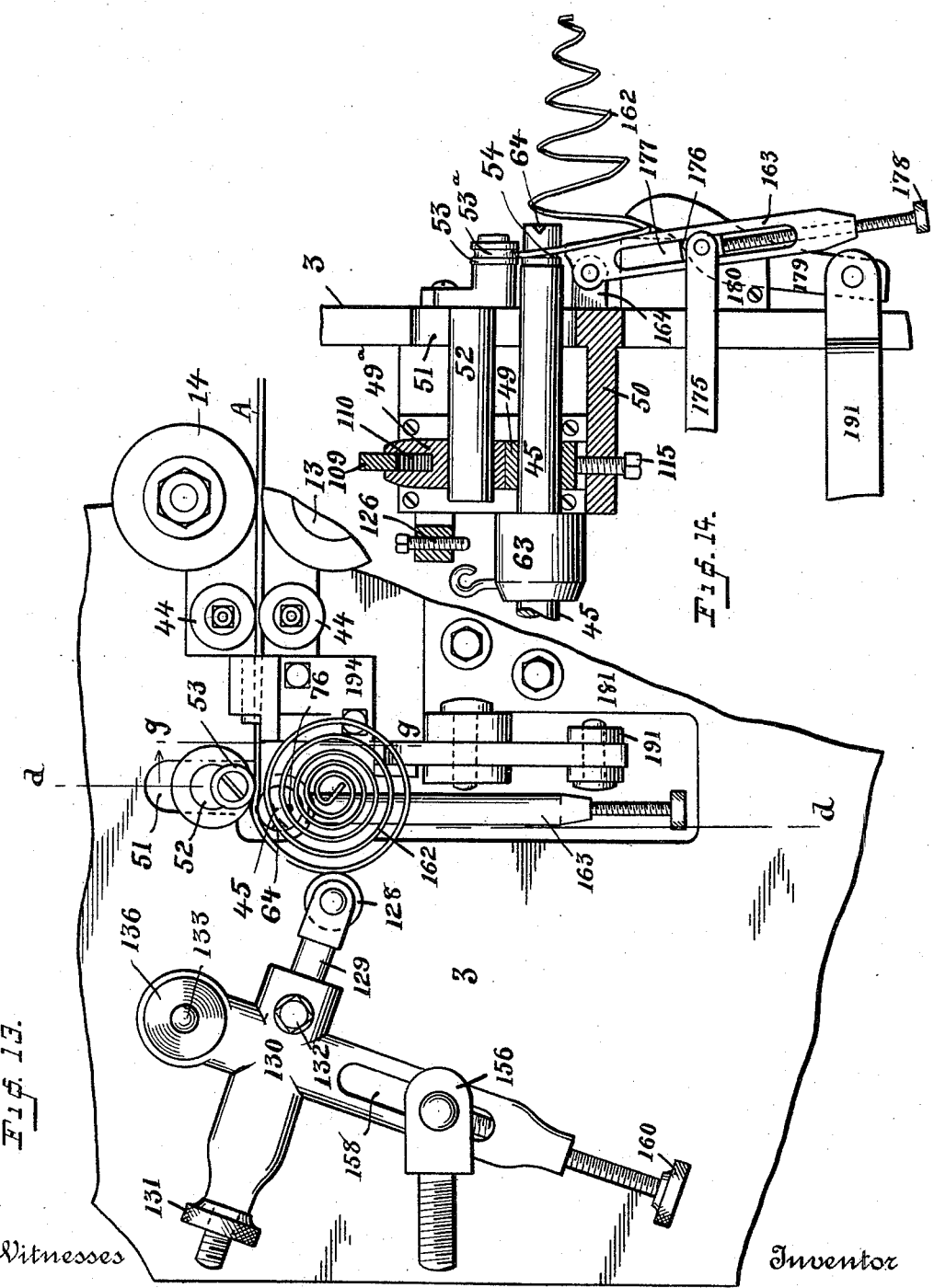

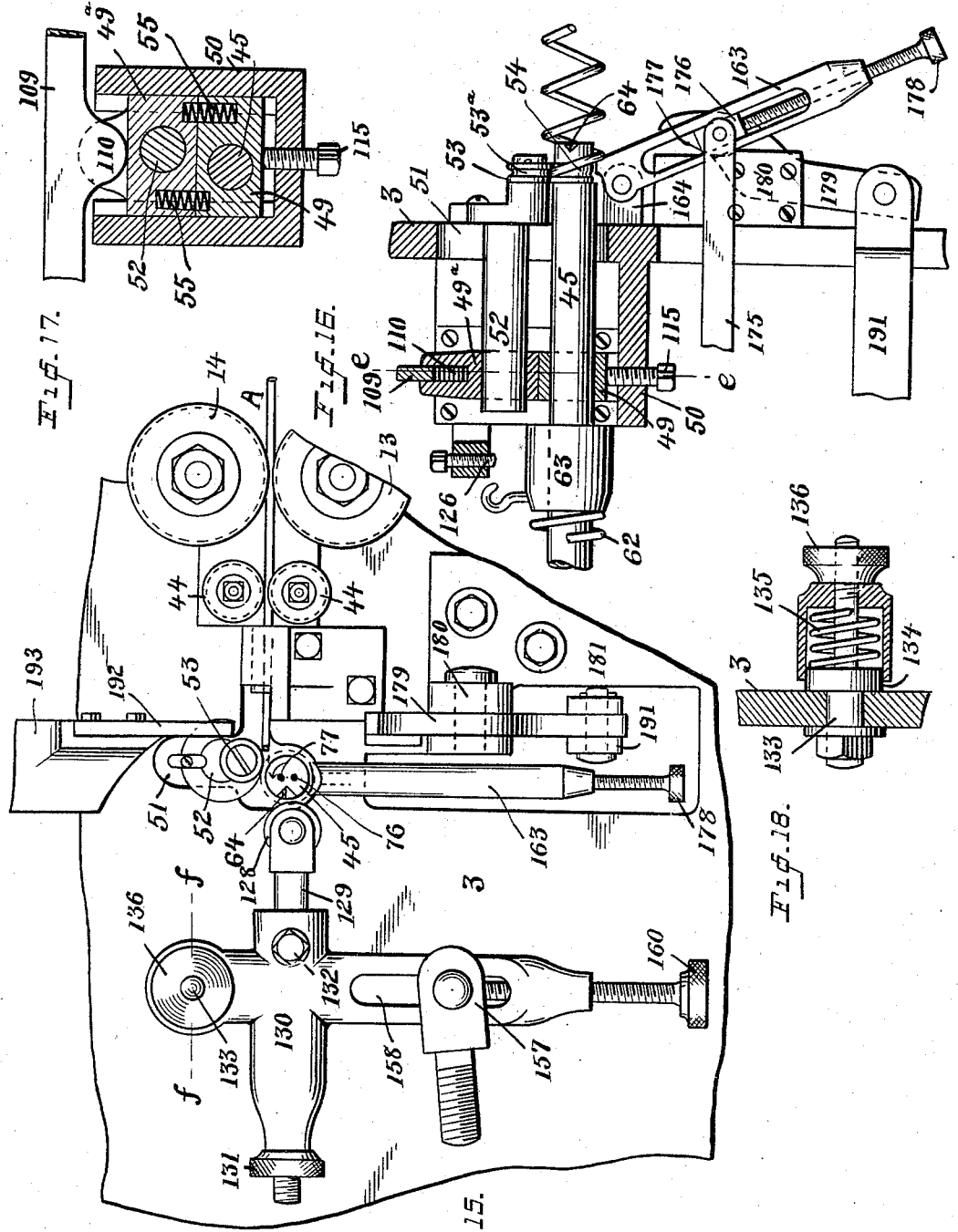

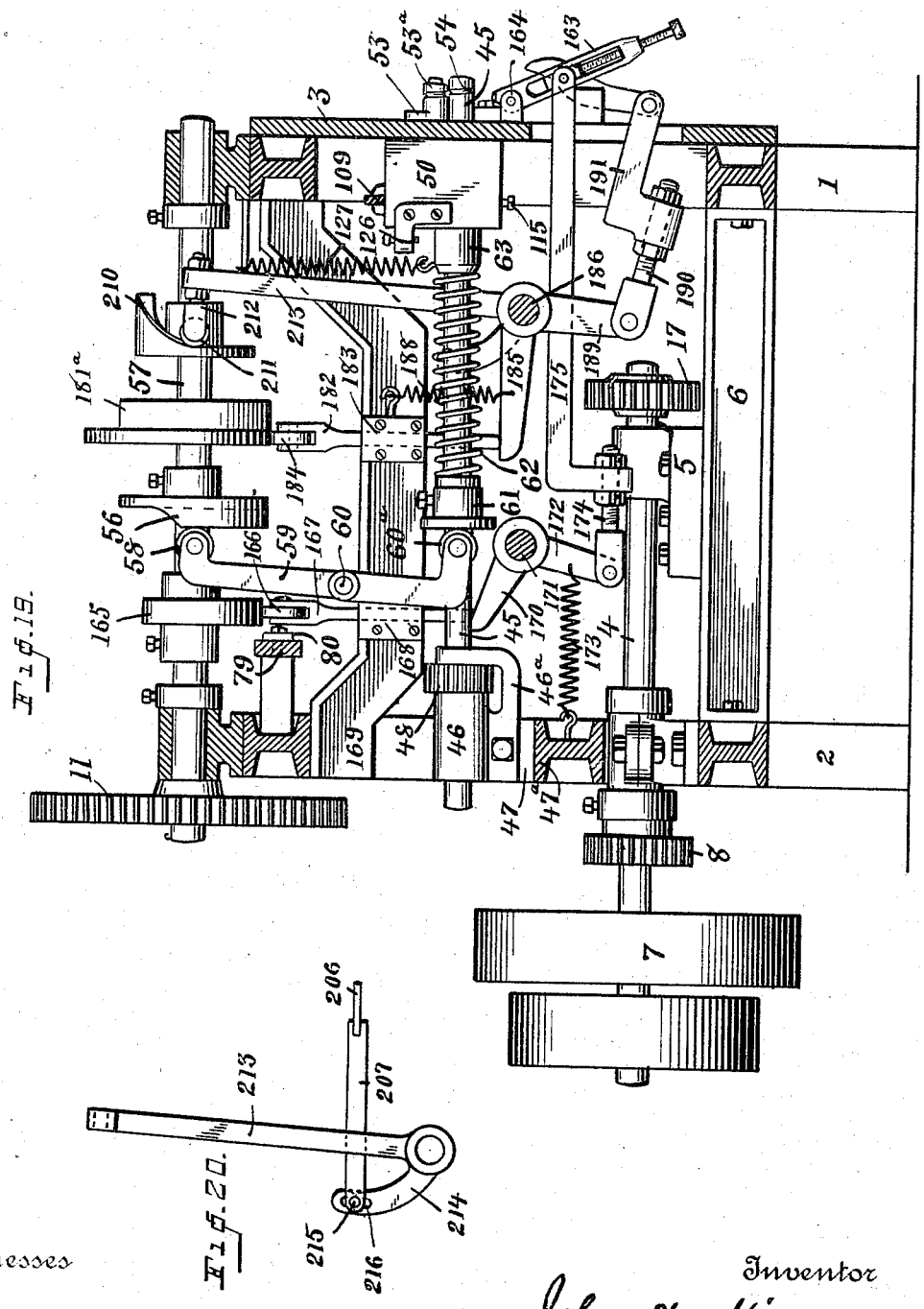

UNITED STATES PATENT OFFICE.

JOHN H. MILLER, OF BRIDGEPORT, CONNECTICUT, ASSIGNOR TO THE MILLER WIRE SPRING COMPANY, OF SAME PLACE.

MACHINE FOR MAKING WIRE SPRINGS.

SPECIFICATION forming part of Letters Patent No. 537,472, dated April 16, 1895.

Application filed November 23, 1892. Serial No. 452,931. (No model.)

*To all whom it may concern:*

Be it known that I, JOHN H. MILLER, a citizen of the United States, residing at Bridgeport, in the county of Fairfield and State of Connecticut, have invented certain new and useful Improvements in Machines for Making Wire Springs; and I do hereby declare the following to be a full, clear, and exact description of the invention, such as will enable others skilled in the art to which it appertains to make and use the same.

This invention relates to certain novel and useful improvements in machines for making wire springs, and while it may be adjusted and adapted for the production of a great number of different kinds and shapes of springs, I have particularly designed it with reference to the rapid and economical manufacture of bed springs, furniture springs, and the springs used in general for seats, cushions and other upholstery. As above stated, however, its use is not limited to the several classes of springs just enumerated.

The first object of my invention is to provide a machine which, from a coil of wire adjacent thereto, shall automatically form and cut off completed springs seriatim without the intervention of hand labor.

The second object of my invention is to dispense entirely with any mandrel, winding block or form for supporting the wire as the same is wound.

The third object which I have in view is to provide a novel form of bending mechanism which shall be adjustable and whereby springs of various diameters may be produced, and whereby the diameter of different coils of the same spring may be varied and graded.

The fourth object of my invention is to provide mechanism which, operating in connection with the bending devices, shall automatically control and vary the pitch.

The fifth object of my invention is to provide in connection with the bending devices a novel and efficient form of winding mechanism whereby an eye may be turned upon the end of the wire and the first coil of the spring or a part thereof formed and completed prior to the initial action of the bending devices.
In addition to the foregoing, minor features of my improvement comprise a series of adjustments for the several operating mechanisms for the purpose of adapting the machine to the various kinds and shapes of springs, and the use in connection therewith of varying sizes of wire.

Finally I design to provide a machine which, in view of the number of operations which it performs and the adjustments of which it is capable, shall be simple in construction and not likely to get out of order.

With the ends hereinbefore specified in view my invention consists and resides in the construction and in the several combinations of co-operating elements and in the several mechanical organizations both general and special which are to be hereinafter fully and in detail explained and then recited in the claims.

In order that those skilled in the art to which my invention appertains may fully understand its construction and method of operation, I will now describe the same in detail, reference being had to the accompanying drawings which are annexed to and form a part of this specification, and to the numerals marked upon said drawings.

The same numerals and letters denote the same parts in each of the several figures.

Figure 2:
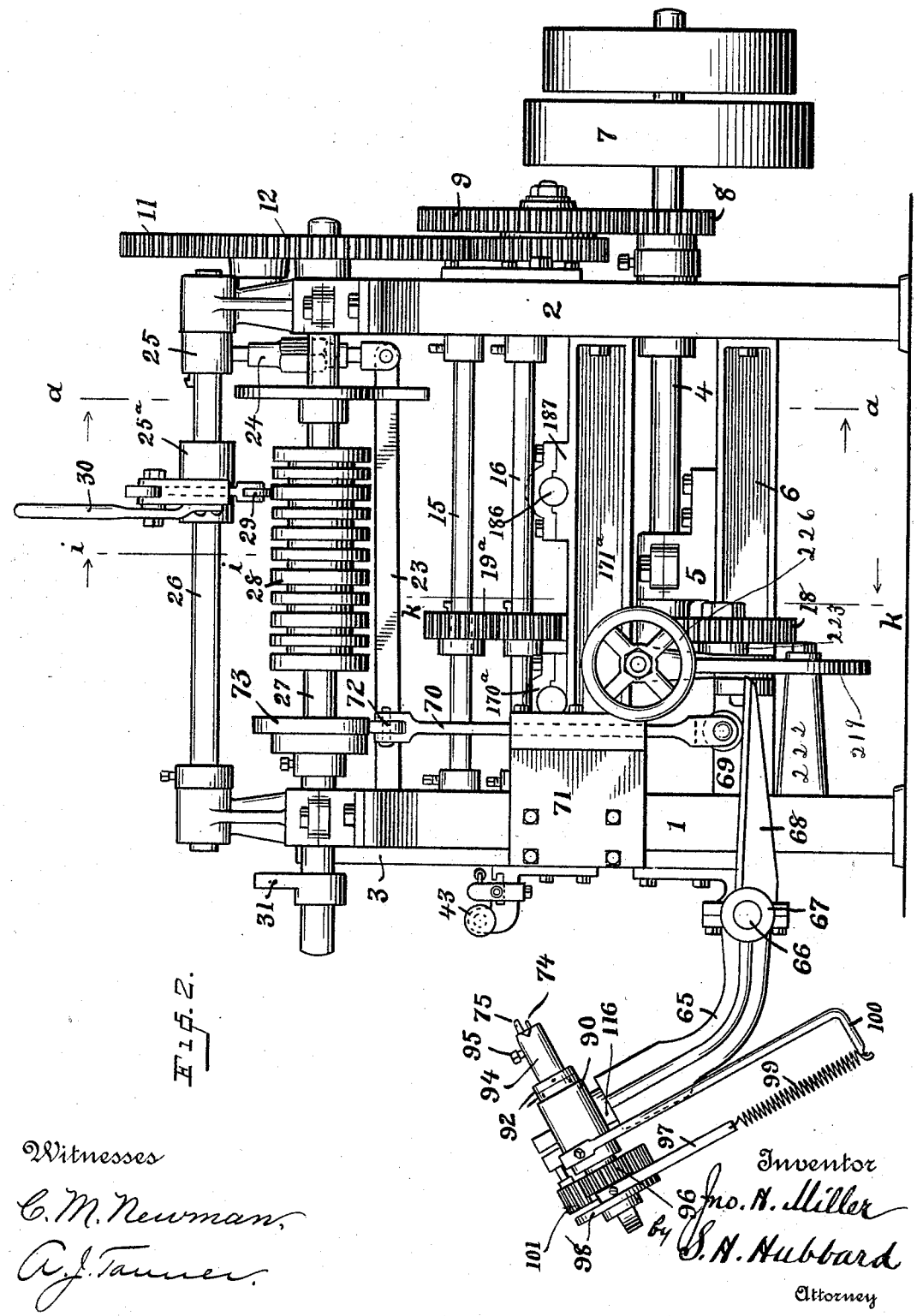

Figure 1 shows the machine in plan view. Fig. 2 is an elevation from the rear end of the machine, that is, looking from the top of Fig. 1. Fig. 3 is a front side elevation looking from the left of Fig. 2. Fig. 4 is an elevation looking from the right of Fig. 2, and showing what I term the rear side of the machine. Fig. 5 is an elevation looking from the rear end of the machine, that is, opposed to the view shown at Fig. 2. Fig. 6 is a vertical longitudinal section taken at the line $a-a$ of Figs. 2 and 5. Fig. 7 is a side elevation of the rear side of the machine, like Fig. 4, but with the gears and band wheel removed. Fig. 8 is a detail section through a part of the frame of the machine and showing with greater particularity the feed-roll shafts and their connections which appear at the central part of Fig. 2. Fig. 9 is a detail side elevation of the eye-former. Fig. 10 is a side elevation opposite to Fig. 9. Fig. 11 is a sectional plan, the section being taken on the line $c-c$ of Fig. 9. Fig. 12 is a detail face view of the larger gear which appears in the three preceding figures. Fig. 13 is an enlarged detail face view of the bending devices which appear near the center of Fig. 3. Fig. 14 is a detail sectional elevation looking from the left of Fig. 13, the section being taken at the line *d—d* of Fig. 13. Fig. 15 is an elevation similar to Fig. 13, showing the parts in different position; Fig. 16 a view similar to Fig. 14, but showing the parts in a different position. In Figs. 13 and 14 the machine is shown as making one form of spring, and Figs. 15 and 16 show the production of a different shape of spring. Fig. 17 is a vertical section on the line *e—e* of Fig. 16. Fig. 18 is a section on the line *f—f* of Fig. 15. Fig. 19 is a vertical section on the line *b—b* of Fig. 1. Fig. 20 is a detail elevation of the vertically disposed lever shown near the right hand of Fig. 19 and partially hidden by the other parts of the machine. Fig. 21 is an enlarged detail section taken on the line *g—g* of Fig. 13; and Fig. 22 is a detail sectional plan on the line *h—h* of Fig. 21, these two figures showing the devices operated by the lever of which Fig. 20 is a detail. Fig. 23 is an enlarged detail side elevation of the feeding slide whereby the initial forward movement of the wire is effected at the commencement of each spring; and Fig. 24 is a detail plan of the parts shown at Fig. 23. Fig. 25 is a detail vertical section on the line *i—i* of Fig. 2. Fig. 26 is a vertical section on the line *j—j* of Fig. 8, looking toward the right hand of the machine. Fig. 27 is a vertical section on the line *k—k* of Fig. 2, of the feed shafts and their gear connections. Fig. 28 represents one of the products of the machine in the shape of a double spring.

In a general way the operation of my machine toward the wire may be gathered from the following description taken in connection with Fig. 3 of the drawings.

The wire, which I denote by A, comes from a reel or coil at the rear of, or otherwise adjacent to the machine. It first passes beneath a rocking feeding foot by means of which the first slight initial forward feeding movement of the wire is performed prior to the engagement with the wire of the two pairs of feeding rollers between which the wire next passes, and which push the wire forward after the eye has been turned in the end of the spring and the first turn made. Said rollers, however, during this formation of the eye and first turn are separated so that they do not engage the wire. Conversely, during the operation of the rollers, the feeding foot is out of engagement with the wire, so that the feeding of the latter is performed by two distinct instrumentalities operating serially, namely, the feeding foot which causes the wire to make its initial advance, and the rollers which afterward take up the feeding and continue it up to the time when the spring is severed. The movement which the foot effects is only just sufficient to carry the end of the wire from the vertical line of the cutting knife up to, and into the notched side of the eye-twisting shaft which appears at the left of the feed rolls in the said figure. At this time the device for turning the eye which appears at the left hand of Fig. 2, rises upon its fulcrum and the two pins in its outer end enter suitable recesses in the end of the twisting shaft and in so doing firmly secure the end of the wire to said shaft. The latter then commences to turn carrying the projecting end of the eye-turner around with it, this being accomplished by the engagement of the pins with the sockets which appear in the end of the shaft. The first revolution of the shaft winds the wire around the larger of the two pins just mentioned and thereby forms the loop or eye on the extremity of the wire. After this is formed the wire runs into a spiral groove formed on the shaft and winds into that groove for about half a turn (the shaft meanwhile advancing slightly outward) which carries the wire into the field of action of the bending rollers of which there are three. Of these the body of the twisting shaft constitutes one, the second is just above it, and the third is located to the left of and below the other two, and is mounted in the end of a rock lever. The positions of the top and side roll vary automatically relative to the shaft and thereby the contour of the bent wire is caused to vary. When the bending rollers take hold, the pin-carrying rocker drops back and releases the wire, and the spring as fast as formed is projected outward into space and without support, at approximately right angles to the face of the machine until the determinate length of wire has been consumed. Then the cutting knife, which appears at the right and a little above the shaft, descends and severs the spring from the length of wire. During the bending operation the pitch of the spring is determined by the outward movement of a bending arm which appears in Fig. 3 directly below the shaft. This arm engages against the wire just after it leaves the rolls and crowds it away from the face of the machine. If the spring is to be of even pitch throughout its length the arm is stationary, but if the spring is to be of unequal pitch as to its several coils then the movement of the arm is varied to produce the required result. The mechanism whereby these several instrumentalities are operated, and the adjusting means therefor will now be described in detail with reference to the general features referred to in the foregoing description.

The several parts of the machine are hung between two side frames 1 and 2, or attached to a face plate 3 which is affixed to the outer surface of the standard 1. The main shaft, which I denote by 4, has a bearing in the standard 2 and also in a bearing block 5, which latter is secured upon a cross piece 6 between the side frames, as clearly appears at Figs. 2 and 8. The main shaft is driven by any ordinary band wheel 7 and upon the outside of its bearing it carries a gear 8 which communicates motion to the gears 9, 10, 11 and 12, and the details of the driving connection between these may be readily gathered from an inspection of Fig. 4 and need no further description. All of the several mechanisms hereinafter to be described are driven from the gears upon the outside of the frame to which reference has just been made, with the exception of the feeding rollers which appear in front elevation at Fig. 3 and of which the lower pair are denoted by 13 and the upper pair by 14. These feeding rollers, as may be seen by reference to Figs. 6, 8 and 27, are carried by four shafts of which the two upper shafts are designated by 15 and the two lower shafts by 16. These shafts derive their movement from a gear 17 upon the inner end of the main shaft through idlers 18 and 19 whose arrangement appears at Fig. 27. The said shafts are connected by suitable gears 19$^a$ near their centers. Of the two shafts 15 and 16 the lower is stationary except for purposes of rotation, but the upper shafts are mounted in blocks 20 and 21, as shown at Figs. 8 and 26, which blocks are arranged to have a slight vertical movement toward and away from the fixed bearings of the lower shaft and are normally upheld by springs 22 whereby the grooved co-operating faces of the feeding rollers are normally held apart.

In Fig. 8 is shown a lever 23 provided near its fulcrum with a projection for engagement with the blocks 21, whereby said blocks, when the outer end of the lever is depressed, may be forced downward to close the two pairs of rollers together. A connection 24 joins the outer end of this lever to a rock lever 25 which is rigidly supported upon a transverse shaft 26. Also mounted upon this shaft is a second rock lever 25$^a$ to which it is splined and upon which it is adapted to have a longitudinal adjustment for the purpose now to be explained. The large gear 12 drives a shaft 27 and upon this shaft are secured a considerable number of cams 28 having various conformations, and the outer end of the rock lever 25$^a$ carries a contact roll 29 adapted to engage either of these cams according to the position of the lever 25$^a$ upon the shaft 26. The contact roll 29 has a slight independent adjustment by means of the cam lever 30 shown in Fig. 25, the purpose of which is to slightly regulate the throw of the lever 25$^a$ and therefore the bite of the feeding rolls whereby they may be arranged for use in connection with wire of different sizes. As has been heretofore explained, the feeding rollers grasp and feed the wire during a portion only of the time consumed in making the whole spring, and as this varies with springs of different shapes and sizes I have furnished the shaft 27 with the considerable number of cams 28 which are shown thereon, and the different contours of these several cams determine the duration and timing of the feeding action of the rollers.

In the production of different kinds of springs it will be obvious that different lengths of wire will be consumed, varying from fifteen to fifty inches. Should a longer wire be consumed the shafts 15 and 16 which carry the feed rolls must be revolved faster in order that such longer wire may be fed in the same time as that taken up by the feeding of a shorter wire, and on the other hand, should a shorter wire be consumed said shafts must be revolved more slowly in order that the time taken up by feeding the shorter wire may just equal the time taken up by the feeding of a longer wire. This is necessary in order that the general timing of the machine may not be interfered with. In order to accomplish this I simply use gears 17 of different sizes, and it will be clear that should I substitute for the smaller gear 17 a larger gear 17 the shafts 15 and 16 will be revolved faster for the purpose of causing a longer wire to be fed, and should I substitute for the larger gear 17 a smaller gear 17 the shafts 15 and 16 would thereby be revolved slower to cause a shorter piece of wire to be fed. It will thus be seen that while the speed of the shafts which carry the feed rolls may be changed, the speed of the main shaft 4 always remains the same. In order to facilitate this substitution of gears the gear 18 is journaled within a swinging bracket 217 pivoted at 218 to the frame of the machine and having a depending ear 219 with a curved elongated slot 220, through which latter projects a stud 221 on the end of an abutment 222 which latter extends from and is rigid with the frame of the machine. The ear 219 lies flat against the abutment 222, and the stud is threaded and ordinary nuts are used in connection therewith to bind the ear and therefore the bracket in any suitable adjustment in a vertical plane. The box 223 (see Fig. 2) within which the short shaft 224 of the gear 18 is journaled is confined within the bracket 217 and is capable of sliding freely therein, and through this box is passed a short screw 225 capable of rotation but stationary as to lengthwise movement and provided with a hand wheel 226.

When it becomes necessary to substitute larger or smaller gears 17, the bracket 217 is lowered or elevated as the case may demand and the screw 225 operated to bring the gear 18 into meshing engagement with the substituted gear 17 and with the gear 19. In other words, the gears 17, 18 and 19 are simple change speed gears.

The same shaft 27 by means of which the appropriate movement is imparted to the two pairs of feeding rolls whereby they are caused to act upon the wire, or to leave the same free, also operates the foot and the parts connected therewith whereby the initial or preliminary feeding movement is accomplished. This it does by means of the cam 31 mounted upon its extremity farthest from the gear wheel 12, as is shown at Fig. 3, and also at the upper right hand corner of Fig. 1. This cam through a roller 32 operates to impart longitudinal movement to an L-shaped slide 33 which has a sliding bearing in a suitable bracket 34 mounted against the face plate. This slide is normally projected to the right by the drawing action of a spring 35 which holds the roller against the cam, and its movement in this direction may be limited to any extent desired by means of the screw-threaded stop 36 shown at Fig. 1 or any other suitable contrivance. The lower end of the slide is connected by means of a rod 37 with the upper end of the feeding clutch foot 38, and this feeding clutch foot, as at 39, (see Fig. 23 as well as Fig. 3) is fulcrumed between ears 40, which latter are mounted upon or form a part of the slide 41. This slide 41 is gibbed to a bracket 42 fastened to the frame. In the operation of the machine, when the proper time has arrived for the initial feeding movement the cam 31 forces the slide 33 toward the left, reference being now had to Fig. 3. The first effect produced by this movement is to rock the foot 38 on its fulcrum 39, whereby its lower surface is caused to descend and to clamp the wire firmly between it and the upper surface of the slide 41, after which the remaining movement of the slide 33 carries the slide 41 and the foot 38 with it and forces the wire along to the extent required. This foot has another adjustment in the stop 43 shown at Figs. 3 and 23, whereby the longitudinal movement of the slide may be varied. Still referring to Fig. 3, 44 are guide rollers shown at the left of the main feeding rollers. Their purpose is simply to steady the wire and to some extent they act as straighteners.

The construction of the rotating shaft which I term the shifter shaft, is now to be described, and its construction and the connections whereby it is caused to operate will be most readily understood by reference to Figs. 6, 7, 13, 14, 15, 16, 17, and 19. In Fig. 19 this shaft, which is denoted by 45, is shown in side elevation. Its rear end has a journal bearing in a box 46 which is fulcrumed to the bracket 47 on the brace 47ª, and this connection will permit the outer end of the shaft to be raised and lowered for the purposes necessary in connection with its operation. Said shaft is caused to rotate by means of a gear 48 shown in Fig. 19, and said gear is connected to the shaft by a spline, so that said shaft may have a movement in the direction of its length, the gear being held always in the same vertical plane between two jaws of the bracket 46ª, as appears in the drawings. The outer end of said shaft has a bearing in a block 49, as is shown particularly at Figs. 16 and 17, and this block is arranged to have a rising and falling movement in a housing 50, and in front of this housing the face plate is cut away, leaving an opening through which the outer end of the shaft projects, and this opening is designated by 51 in Fig. 16. The housing just referred to also carries the short shaft 52 upon which is mounted the bending roll 53 whose groove 53ª co-operates with the bending groove 54 in the outer end of the shaft 45. The block 49, as appears in Fig. 17, is formed in two parts between which springs 55 are arranged to permit of a slight independent movement between the faces of the bending rollers.

As before mentioned, the first initial forward movement of the wire is for the purpose of forming at the end thereof an eye or loop, and the mechanism for accomplishing this will now be fully described. The shifter shaft 45 is provided, as heretofore mentioned, with a longitudinal movement in its supports, in one direction, by means of the cam 56 (see Figs. 1 and 19) on the shaft 57 engaging with the roller 58 of the lever 59, which lever is fulcrumed on the pin 60. The other end of this lever carries the roll 60ª which engages the face of the flanged collar 61 on the shaft 45. The return movement of this shaft is effected through the medium of the spring 62 interposed between collars 61 and 63, which forces it back as fast as the cam 56 retreats, until the notch 64 in the end of this shaft 45 (see also Fig. 3) is brought in line and into engagement with the advanced end of the wire. Everything is now in readiness for the forward movement of the eye-forming device, which is constructed and operated as follows: The mechanism relating thereto is adjustably supported upon the arm 65 (see Fig. 2) and this arm is rigidly supported upon the rock shaft 66, which shaft is journaled in the bearings 67 of the frame 1. Upon the projecting end of the shaft 66 is rigidly mounted a second arm 68 whose free end is brought into engagement with the roller 69 which is pivotally supported in one end of the sliding bar 70. This bar is also supported by the bracket 71 of the frame 1, and operates freely therein. Roll 72 in the opposite end of the bar 70 engages the cam 73 mounted upon the shaft 27, so that by the arrangement of the bar, cam and arm, as above described, the shaft 66 is partially rotated, and by so doing the eye-forming device is brought into engagement as follows: The pins 74 and 75 will enter the holes 76 and 77 in the end of the shifter shaft 45. (See also Fig. 3.) Immediately following the engagement of said pins a rotary motion is imparted to the shaft 45 by means of the cam 78, which cam is mounted upon the shaft 27, as more clearly appears at Fig. 6. The intermediate mechanism operating between cam 78 and the shaft 45 consists of the slotted sliding bar 79 operatively mounted in the bracket 80 of the side frame 2. The roller 81 pivotally supported in the end of the bar 79 engages with the face of the cam 78, and the opposite end of said lever is pivoted to the link 82, which in turn pivotally engages with the pitman 83 journaled upon the shaft 84. The weighted arm 83ª attached to the pitman 83 serves to keep roll 81 in contact with its cam 78. The lower slotted end of this pitman engages with the stud 85 projecting from the crank arm 86 keyed to the stud 87 (see also Fig. 7), which stud is supported against the face of the frame 2. Rigidly mounted upon this stud is the large gear segment 88 which engages with the pinion or small gear 48 of the shaft 45 heretofore referred to, causing the same to rotate, and this rotation by reason of the engagement of pins 74 and 75 therewith, as previously described, will impart a rotary movement to the forming shaft 89 operating in the support 90 in a manner to be more fully described. This movement, together with the location of the projecting end of the wire to be acted upon between the pins 74 and 75, will deflect the same sufficiently to form the necessary loop or eye.

The operation of the several parts of the eye-forming device shown in Figs. 9, 10, 11 and 12 will now be fully explained in detail. The shaft 89 is splined to the sleeve 91 in which it is allowed a longitudinal movement, while the sleeve, by means of its connection with said shaft, is caused to rotate therewith in its support 90, which sleeve is also held thereto by means of the nuts 92 and 93. The pin 74 projecting from the shaft 89 is guided freely through the collet 94, which in turn is screwed into the end of sleeve 91. In the end of this collet is fixed, by means of screw 95, the other pin 75. The shaft 89 carries upon its outer end the pinion 96 and also the band spring 97 placed between the collar 98 and said pinion. This band spring is secured at one end to the shaft 89 and at the other to the retractile spring 99, which in turn is secured to the arm 100 of the support 90.

101 is a larger and wider gear engaging with pinion 96 and is journaled upon the stud 102 on the projection 103 of support 90. Spring bolt 104 is operatively mounted in the projection 103, and is arranged to enter either the hole 105 or the inclined recess 106 in the face of the gear 101. The spring 107 on stud 102 engages the end of the shaft 89 and operates to maintain the shaft in its forward position, and will also allow said shaft to retreat when any undue force is brought to bear on the end of pin 74. The pin 75, acting as a driver, will therefore project a greater distance into the end of the shifter shaft than the pin 74, which pin 74 simply engages a countersunk hole therein. When, therefore, motion is imparted from the shifter shaft to the shaft 89, the gear 101 is rotated until the hole 105 is brought into position to receive the bolt 104, which bolt is forced therein by means of its spring 108. This operation represents the rotary distance traveled to form the eye or loop, and it also winds the band spring 97 around the shaft 89 for the purpose presently to be described.

The depression of the shifter shaft 45 for the purpose of bringing its periphery on a line with the wire to form the coils, follows immediately after the eye-forming operation just described, and is effected as follows: The lever 109 (see Figs. 17 and 19) has the projection 110 which bears upon the upper half 49ª of the block 49 heretofore referred to. This lever, which is pivotally supported against frame 2 carries at its free end the roll 111 shown more particularly in Fig. 5, which roll engages with the cam 112 mounted upon the shaft 113 journaled in the boxes 114 of the side frames 1 and 2. One of said boxes is shown in Fig. 3 with the said shaft removed therefrom. The effect produced by this cam and its intermediary lever will be to depress or force downward blocks 49 and 49ª, as well as the shafts therein, (reference being had more particularly to Figs. 14 and 17) until the limit represented by the set screw 115 is reached. The pins of the eye-forming device being still engaged with the shifter shaft, the downward movement of said shaft will also carry with it the support 90 (see Fig. 10) whose shank 116 is operatively gibbed to the arm 65. The lug 117 projecting from this shank carries the pin 118 which is also operatively supported in the projection 119 of the arm 65. Said pin carries the spring 120 between the projecting lugs 117 and 119, and the jaw nut 121 on its outer threaded end. When, therefore, the downward limit of the shifter shaft is reached, as before mentioned, the support 90 will be correspondingly depressed until the swing catch 122, under the influence of its spring 122ª, engages the upper face of lug 117. As the forward movement of the shifter shaft 45 follows so closely after the eye-bending operation, it is not advisable to withdraw the eye former until the lower plane just described has been reached, when the operating cam of the eye former will cause the same to retreat to its former position, as shown in Fig. 5. Just before reaching this position, however, the toe of the L-shaped lever 123, which lever is pivoted to the lug 124 of the projection 103 and whose outer end engages the bolt 104, will strike the trip arm 125 projecting from the frame, and by so doing causes the withdrawal of the locking bolt from its engagement with the gear 101. The band spring 97 will now operate to return all of the parts to their normal position, which position is reached when the spring bolt 104 engages with the end of the inclined slot 106 shown in Fig. 12.

Referring now to Fig. 5, the jar given to the eye-forming device when it reaches its extreme outer position, will be sufficient to disengage the swing catch 122, and the reaction of spring 120 will elevate the support 90 to its former position in readiness to again engage the shifter shaft 45, when said shaft, by means of the spring 127, (as shown at Fig. 19) shall have reached its higher plane, as represented by the stop 126.

Referring now more particularly to Figs. 3, 13, 14, 15, and 16 for the mechanism necessary to establish the diameter of the springs, 128 represents the third bending roll pivotally mounted in the end of the spindle 129, said spindle being adjustably secured to the arm 130 by means of the nut 131 mounted upon the threaded end of said spindle; which nut, together with the set screw 132, will adjust and secure said spindle in its support with respect to the movement or throw of the arm 130, and also with respect to the angular position the roll will assume during the formation of the coils of the spring. Arm 130 is pivotally supported upon the stud 133, which stud (see also Fig. 18) is supported in the plate 3 as shown. The inner face of the arm 130 is recessed to freely admit the shouldered portion 134 of the stud and also the spring 135, so that, by means of the clamping nut 136 on the end of said stud, any tension can be placed on the roll-supporting arm that may be required, or said arm may be firmly clamped to the plate 3 when springs of uniform diameters are to be formed. This roll-bending arm is operated or rather controlled in its movements by means of either of the four cams 137, 138, 139 and 140, which cams (see Fig. 5) are mounted upon the shaft 113. These cams have each a different configuration or shape, so that the movement or travel of the swinging roll-bending arm is properly timed with respect to the wire fed thereto, and to the peculiar formation of the coil of spring required. The lever 141 carries in its end the roll 142, which roll is also brought into engagement with any of the above mentioned cams in the following manner: Said lever 141 is supported in the block 143 and is arranged to have a vertical sliding movement therein. Said block is also operatively supported in the cross bar 144 (see also Fig. 6) which bar is attached to each of the side frames 1 and 2. Referring again to Fig. 5, the rod 145 whose ends are mounted in the brackets 146 of the above mentioned side frames, also passes freely through block 143, and said block is held firmly thereto by means of the set screw 147. The toe 148 of the lever 141 engages with the rod 149 whose ends are secured to the arms 150, which arms are in turn rigidly mounted upon the rock shaft 151, and this shaft is journaled in the bearings 152 of the side frames 1 and 2. The weighted lever 153 (see also Fig. 3) is also rigidly mounted upon said rock shaft for the purpose of insuring contact between the above mentioned roll and cam. The rock shaft 151 also carries the rock arm 154, which is brought into operative engagement with the roll-bending arm 130 by means of the adjustable connection 155 whose forked heads 156 and 157 are each pivotally supported to blocks (not shown) arranged to be adjusted in the slots 158 and 159 of the arms 130 and 154 by means of their respective adjusting screws 160 and 161 arranged as shown. It will also be observed that the heads 156 and 157 of the connection 155 have each a threaded end which engages with a threaded central portion, whereby said connection is adjusted as to its length. This, however, being an old mechanical construction does not require special mention. When, therefore, the cam, which influences the rock shaft 151 and all the parts connected therewith as above fully set forth, is at the highest point of its throw, the roll-bending arm 130 is in the position shown in Figs. 3 and 13, and its roll 128 will occupy a certain position with respect to the shaft 45, which position is determined or represented by the smallest diameter or apex of the helical spring 162 shown in Figs. 13 and 14. Now when the above mentioned cam begins to retreat the rock shaft 151 will under the influence of its weighted arm 153, turn on its support (see Fig. 13) and swing the roll-bending arm 130 outward, thus varying the diameter of the several coils of the spring in accordance with the shape of the cam which operates it, combined also with the adjustable feature of the connections placed between said roll-bending arm and its cam, and this operation will continue until the required length of spring is obtained, when said spring will be severed from the rod or wire by an operation presently to be described.

In connection with the roll-bending arm just described I employ the spreader bar 163 seen at Figs. 3, 13, 14, 16 and 19. Referring more particularly to Fig. 19, this spreader bar is pivotally supported near its upper end to the projecting lug 164 of the side plate 3 and is arranged to be set at any angle that will determine the pitch of the coils of the spring that is being wound. This operation will now be described.

The spreader arm 163 is operated by means of the cam 165 mounted upon the shaft 57, which cam is also seen at Figs. 1, 4 and 6. Referring once more to Fig. 19, the roll 166, which engages with the face of said cam, is pivotally supported in the end of the vertically operating bar or lever 167. The guiding support for the same consists of the slotted block 168, which is secured to the cross piece 169, which cross piece is shown in section at Fig. 6. The lower end of said bar 167 engages with the rock lever arm 170 which is mounted upon the shaft 171. This shaft is also supported in boxes attached to the frame of the machine, one of which boxes 170$^a$ may be seen at Fig. 2 mounted upon the cross piece 171$^a$. The other arm 172 of said rock lever is brought under the influence of the spring 173, which spring operates to insure the engagement of the above mentioned roll with its cam. The adjustable link connection 174 unites the arm 172 with an offset portion of the bar 175, and this bar is in turn pivotally supported to the sliding block 176, which block may be seen more clearly in Fig. 14. This sliding block is mounted in the slot 177 of the spreader bar 163 and is arranged to be operated therein by means of the adjusting screw 178, so that, by means of the adjustable feature of the sliding block before mentioned, the leverage of the spreader bar is increased or diminished, which arrangement determines the angle of said bar, and in consequence thereof the pitch also of the spring to be wound. Therefore, in winding a helical spring similar to 162 shown at Fig. 14, wherein, as before stated, the pitch is made to vary with each coil, the grip of the bar 175 on the spreader bar will be so adjusted with respect to the throw of the cam that operates it, and the pitch required, that the position or angle of the spreader bar will be changed at each turn of the coil.

In winding springs having a uniform pitch, as shown in Fig. 16, the bar 163 would be set at the required angle and firmly secured in that position during the entire operation.

The machine is furnished with two separate devices for severing the springs from the rod or wire, one operating just back of the bending rolls, and the other in advance of the same. The former is employed in severing what I term a whole spring, as shown at Fig. 28, while the latter device is used for the half spring shown at Fig. 14.

I will now describe the operation of the device used for cutting off the half springs, reference being had to Figs. 13, 16 and 19, especially to the latter figure. 179 is a cutting knife fulcrumed between the ears 180 of the adjustable support 181 which is secured to the face of plate 3. This knife is operated by the cam 181ª mounted upon the shaft 57, shown also at Fig. 1. The roll carrying bar 182 is operatively mounted in the block 183 of the cross piece or brace 169. The upper end of this bar carries the roll 184 to engage with the cam 181ª, while the lower end of said bar engages with the rocker arm 185, which arm, or the hub portion thereof, is mounted upon the shaft 186 and is journaled in boxes supported to the frame. One of the boxes is numbered 187 and may be seen upon the cross piece 171ª at Fig. 2. Referring once more to Fig. 19, the spring 188, which is secured by one end to arm 185, and by the other to a hook as shown, serves to keep the roll 184 in contact with its cam. The other arm 189 of the rocker is pivoted to the short connection 190, which connection is adjustably supported to an offset portion of the bar 191. The other end of said bar is also pivoted to the lower end of the cutting knife 179. It will, therefore, readily be seen that with the proper shaped cam and the adjustable connection 190 the cutting action of the knife can be timed to operate at a predetermined point. The vertically operating knife used as before stated, in severing the full spring, is shown in Figs. 3, 5 and 15. This knife 192 is bolted to the slide 193, as shown, and is adapted in its descent (an operation presently to be described) to engage with and sever the wire against the face of the wire guide 194, which guide is also bolted to the plate 3 as shown. The knife-carrying slide 193 operates freely in the gibs 195, which gibs are in like manner bolted to plate 3. The cam 196 for operating the knife is mounted (see also Fig. 1) upon the shaft 113, while the roll-carrying arm 197 and the arm 198 operatively engaging with the knife-carrying slide 193, are each mounted upon the shaft 84. Referring to Fig. 5, the cam roll 199 is pivotally supported in the short connection 200, which connection is, as shown, adjustably secured to the arm 197, while the link 201, as seen at Fig. 3, is pivotally connected both with the end of the arm 198 and the head portion of the stud 202, which stud is adjustably secured to the offset or projection 203 of the knife slide, as shown. The contact of the roll and cam is insured by means of the spring 204, which is attached by one of its ends to a stud projecting from the frame of the machine, and by its other end to the arm 205 projecting from either the shaft or the arms as may be desired. It will, therefore, be observed from the foregoing that this vertically operating knife may also be adjusted and timed to act at any predetermined point. It will also be noted that its use is not exclusively confined in connection with the double spring previously mentioned, but it is also employed when springs of equal diameters, such as are shown in Fig. 16, are wound, for which, or any other purpose, the cam and the necessary adjustments will need to be changed.

In Figs. 19, 21 and 22 will be seen a device for simply bending the end of the wire at right angles thereto, instead of forming an eye or loop as previously described. Referring more particularly to Fig. 22 for a better view of this device, 206 represents a movable foot actuated by the bar 207 attached to said foot, as shown. This foot has the curved slot 208 therethrough. The screw 209 extends through this slot and its threaded portion is attached to the side of the box or frame 50, allowing, however, the foot to operate freely upon the body portion of said screw. In this view, i. e., Fig. 22, the foot is shown in its normal position, that is, in readiness to be projected forward to do its required work. When, therefore, the foot 206 is advanced by means of its actuating cam) which cam will be presently described) toward the end of the wire projecting through the guide 194, it will be moved along the straight portion of the slot until the end engages the wire, when the dip or curved part of said slot engaging with the screw 209, will cause the foot to tilt, which tilting motion will elevate the extreme curved end of the foot sufficient to insure the end of the wire assuming a position at right angles to its body portion, as shown.

The cam 210 for operating the above mentioned device, is mounted upon the shaft 57, as seen at Figs. 1, 5, and 19. The roll 211 engaging with said cam, is pivotally supported in the short connection 212, which connection is adjustably supported in the end of the vertical lever 213, as shown more clearly at Fig. 19, while the lower end or hub position thereof is journaled upon the shaft 186. This vertical lever (see also Fig. 20) has the curved arm 214 which is projected above the shaft upon which such lever operates, and for the purpose of bringing the bar 207 into operative engagement with the bending foot before mentioned. The pin 215 engaging with the elongated slot 216 in the end of the arm 214, will operate to preserve the horizontal alignment of the bar 207, while said arm is moved through a circular path.

From the foregoing description of my machine, its operation will readily be understood. Its construction is such that it can easily be made available, not only for the purpose of bending springs into almost every conceivable shape and length required, but straight pieces or pins on an equal length may be cut off, or pins having an eye, loop, or other turned portion in the end or body thereof. The above and various other kinds of work of like nature may be performed by simply substituting or changing the cams for others suited to the style of work required, and adjusting the various bars, levers and the other connecting parts engaging therewith.

I claim—

1. The combination in a machine of the character described for forming springs, of the initial forward feeding mechanism and means for operating the same substantially as shown, with a shifter shaft to receive the projecting end of the wire, an eye-former placed adjacent thereto, and means for bringing the same into operative engagement with the wire and said shifter shaft, means for rotating both said shaft and the eye-former, means whereby said shaft is depressed and the wire brought into engagement with a groove therein in readiness to be acted upon by the bending rolls, substantially as set forth.

2. The combination in a spring bending machine, of means for imparting an initial forward movement to the wire and advance the same a predetermined distance, a shifter shaft, means for imparting both vertical and horizontal reciprocating motions thereto, and an eye-former arranged to operate substantially as shown.

3. The combination in a spring bending machine, of means for imparting an initial forward movement to the wire and to advance it a predetermined distance, feeding rolls arranged to be held normally out of engagement with the wire during its initial forward movement, and means provided at the completion of such forward movement to bring said rolls into engagement with the wire and advance it into the field of the bending rolls, substantially as set forth.

4. The combination in a spring bending machine, of feeding rolls arranged on either side of the wire to be fed, shafts upon which said rolls are mounted, a support for the same, and means for imparting motion thereto, means substantially as shown whereby said rolls or the rolls on one side of the wire are alternately brought into engagement therewith and means whereby the rotation of said shafts or the rolls may be increased or diminished, and thereby increase or diminish the travel of the wire in accordance with the length or kind of spring to be wound, substantially as shown.

5. A spring bending machine comprising in combination wire feeding mechanism, bending rolls arranged substantially as shown, one of which rolls is arranged upon or attached to the shifter shaft, means for imparting both a vertical and horizontal reciprocating motion to said shaft, the other bending roll placed adjacent thereto and arranged to be automatically adjusted for different sizes of wire, substantially as described.

6. A spring bending machine, comprising in combination initial wire feeding mechanism, bending rolls, one of which rolls is made slightly adjustable for different sizes of wire, the other of said rolls mounted upon a suitably supported shifter shaft placed adjacent thereto, and means for imparting a rotating as well as a vertical and horizontal reciprocating motion to said shaft, a suitably supported eye-former, means for bringing it into engagement with the shifter shaft, and to be operated thereby, means for releasing the initial feeding mechanism at the proper time, and means for bringing the feeding rolls into engagement with the wire and advance the same continuously forward to the bending rolls to complete the spring, and means for severing the completed spring from the length of wire, all arranged substantially as shown and for the purpose set forth.

7. The combination in a machine for forming or bending springs or articles of like character, of an eye-former, a suitably supported carrier for the same, said eye-former consisting of substantially the following elements, viz., a sleeve or bearing journaled in a support and carrying one of the wire-engaging points or other suitable device for that purpose, a spindle longitudinally adjustable in said sleeve and arranged to be rotated thereby and carrying in its end the other wire engaging device, a pinion on said spindle to engage a gear rotatably mounted on said support, and a locking device arranged in connection with said gear to limit the rotary travel of the eye-former, all arranged to operate substantially as shown.

8. The combination in a machine for forming or bending springs or articles of like character, of an eye-former for forming an eye, loop, or other like bend, and consisting of the following parts, to wit: a spindle 89 carrying a pinion 96 rotatably mounted in the support 91, said spindle arranged to have a longitudinal movement in the sleeve and to be rotated thereby, a wire-bending device 75 connected with said sleeve substantially as shown, a locking gear 101 registering with the aforesaid pinion of the spindle, and a spring-locking bolt 104 arranged to lock the eye-former when its work is completed, substantially as shown.

9. The combination in a spring-bending machine, with one of the bending rolls, and means for imparting a rotary and a lateral movement thereto, of an eye-former, a suitably supported carrier therefor, means whereby they are brought into operative engagement with each other and the wire, the eye-former adjustably supported to its carrier so as to bring it entirely under the control of the bending roll in its rotary and lateral movements, means for carrying the eye-former normally out of engagement with the bending roll, and means substantially as shown for restoring all of the rotatable parts to their normal position, as described.

10. The combination in a spring bending machine, with wire feeding mechanism and primary bending rolls, of a pivotally supported arm carrying a bending roll, which roll engages the wire when delivered from the primary bending rolls, means whereby an automatic variable motion is imparted to said arm and thus vary the diameters of the coils of the spring, and means provided on said arm for adjusting its leverage relative with the motive power or actuating mechanism controlling said arm, substantially as described.

11. A spring bending machine comprising in combination, wire feeding mechanism, primary bending rolls, means for operating both of said devices, pivotally supported arm carrying a bending roll, means for automatically varying the travel of said arm to and from the primary bending rolls, for the purpose set forth, a spreader for establishing the pitch of the coils of the spring, means for automatically varying the travel of the said spreader thereby increasing or diminishing the pitch of the several coils of the spring, substantially as described.

12. The combination in a spring bending machine, with the primary bending rolls and wire feeding mechanism, of a pivotally supported arm carrying a bending roll, means for automatically varying the travel of said arm relative to the primary bending rolls for bending helical springs, or springs of like character, having varying diameters, and means whereby said arm and its roll are adjusted to bend springs of equal diameters, substantially as set forth.

13. A spring bending machine comprising in combination wire feeding mechanism, primary bending rolls, means for operating the same, pivotally supported roll carrying arm, and means for automatically varying its travel relative to the primary bending rolls for the purpose set forth, a spreader for establishing the pitch of the coils, and means for automatically varying its travel, and thereby form a spring having a pitch in accordance therewith, mechanism for severing the completed spring from the length of wire, and means whereby said severing device is adjusted and turned relative to the length of spring required, substantially as described.

In testimony whereof I affix my signature in presence of two witnesses.

JOHN H. MILLER.

Witnesses:
  A. J. TANNER,
  C. M. NEWMAN.